(12) United States Patent
Suzuki et al.

(10) Patent No.: US 7,265,998 B2  
(45) Date of Patent: Sep. 4, 2007

(54) WIRING STRUCTURE USING WIRING HARNESS FOR AUTOMOBILE

(75) Inventors: Hitoshi Suzuki, Kitamoto (JP); Takashi Uchida, Tokorozawa (JP)

(73) Assignee: Calsonic Kansei Corporation, Tokyo (JP)

( * ) Notice: Subject to any disclaimer, the term of this patent is extended or adjusted under 35 U.S.C. 154(b) by 549 days.

(21) Appl. No.: 10/731,101

(22) Filed: Dec. 10, 2003

(65) Prior Publication Data

US 2004/0124706 A1    Jul. 1, 2004

(30) Foreign Application Priority Data

Dec. 13, 2002    (JP) .............. 2002-362451

(51) Int. Cl.  
  *H02B 1/20* (2006.01)
(52) U.S. Cl. .............. 361/826; 361/825; 361/816; 174/51
(58) Field of Classification Search .......... 361/816, 361/818, 825; 174/35 R, 51  
See application file for complete search history.

(56) References Cited

U.S. PATENT DOCUMENTS

| | | | |
|---|---|---|---|
| 5,364,159 A | 11/1994 | Kelman et al. | |
| 5,467,520 A | 11/1995 | Nunez et al. | |
| 5,549,344 A | 8/1996 | Nishijima et al. | |
| 5,712,764 A * | 1/1998 | Baker et al. | 361/690 |
| 5,884,875 A | 3/1999 | Hanada et al. | |
| 6,062,888 A * | 5/2000 | Takiguchi | 439/248 |
| 6,257,897 B1 * | 7/2001 | Kubota | 439/34 |
| 6,621,688 B1 * | 9/2003 | Burdick | 361/627 |
| 2001/0002623 A1 | 6/2001 | Tsunoda et al. | |
| 2001/0003404 A1 | 6/2001 | Shikata et al. | |

FOREIGN PATENT DOCUMENTS

| | | |
|---|---|---|
| JP | 08-119045 | 5/1996 |
| JP | 08-258642 | 10/1996 |
| JP | 3166574 B2 | 3/2001 |
| JP | 2002-293166 | 10/2002 |

* cited by examiner

*Primary Examiner*—Tuan T. Dinh  
*Assistant Examiner*—Hung S. Bui  
(74) *Attorney, Agent, or Firm*—Foley & Lardner LLP

(57) ABSTRACT

A structure for wiring a wiring harness for an automobile between an electronic control unit and devices (22-24) is disclosed. The wiring structure is provided with a housing member (13) including a first portion (19) having a first connector for connection with the devices (22-24), a second portion (20) housing the electronic control unit and a third portion (14) being formed in a slim shape and interconnecting the first portion (19) and the second portion (20), and a wiring harness housed in the third portion (14), the wiring harness interconnecting the first connectors and the electronic control unit. The housing member (13) is arranged along a steering member (10) of the automobile in a manner that the third portion (14) is housed between a control module (12) of the automobile and the steering member (10).

5 Claims, 4 Drawing Sheets

WIRING STRUCTURE USING WIRING HARNESS FOR AUTOMOBILE

BACKGROUND OF THE INVENTION

1. Field of the Invention

The present invention relates to a wiring structure using a wiring harness for an automobile.

2. Description of the Related Art

An instrument panel of an automobile is commonly provided with a wiring harness on a hidden side thereof. Recently, such a wiring harness is getting larger size and weight because more electric circuits are necessary to be installed. Japanese Patent No. 3166574 discloses a related art.

SUMMARY OF THE INVENTION

In these years, large units such as a heater, a ventilator, air conditioner and the like are often installed to a steering member, which is disposed at a hidden side of the instrument panel. When such configured, there is not an enough space for the wiring harness around the steering member and the instrument panel. Furthermore, wiring the wiring harnesses one by one must be very troublesome labor.

The present invention has been achieved in view of the above problem and is intended for providing a wiring structure, which makes wiring labor to be easy.

According to an aspect of the present invention, A structure for wiring a wiring harness for an automobile between an electronic control unit and one or more devices, the automobile having a steering member extended from a driver's seat side of the automobile to an assistant's seat side of the automobile, a control module arranged at a center in a width direction of the steering member and an electronic control unit for controlling the devices arranged at the assistant's seat side of the steering member and a plurality of units arranged at the driver's seat side, the wiring structure is provided with a housing member including a first portion having a first connector for connection with the devices, a second portion housing the electronic control unit and a third portion being formed in a slim shape and interconnecting the first portion and the second portion, and a wiring harness housed in the third portion, the wiring harness interconnecting the first connectors and the electronic control unit, wherein the housing member is arranged along the steering member in a manner that the third portion is housed between the control module and the steering member.

More preferably, the structure is configured so that the control module controls a heater, a ventilator, an air-conditioner and distributions doors.

More preferably, the electronic control unit is provided with a second connector mating with the first connector, an amplifier for a meter and an air-conditioner control amplifier.

More preferably, the first portion is provided with a plurality of first connectors for connection with the devices and the control module is arranged between the first portion and the second portion.

More preferably, the first connectors are formed in a unified shape having a unified terminal alignment and connected with a power bus circuit and a superimposing communication circuit of the electronic control unit.

More preferably, the third portion is so dimensioned as to be insertable in space formed between the control module and the steering member.

DETAILED DESCRIPTION OF THE PREFERRED EMBODIMENT

An embodiment of the present invention will be described hereinafter with reference to FIGS. 1-4. Throughout the specification and the figures, directions are defined on a basis of a view point of a passenger who is regularly seated in an automobile. In the following description and the figures, an example is given where a driver's seat is on the right and an assistant's seat is on the left. However, off course, a reversed configuration can be embodied.

Figure 1:
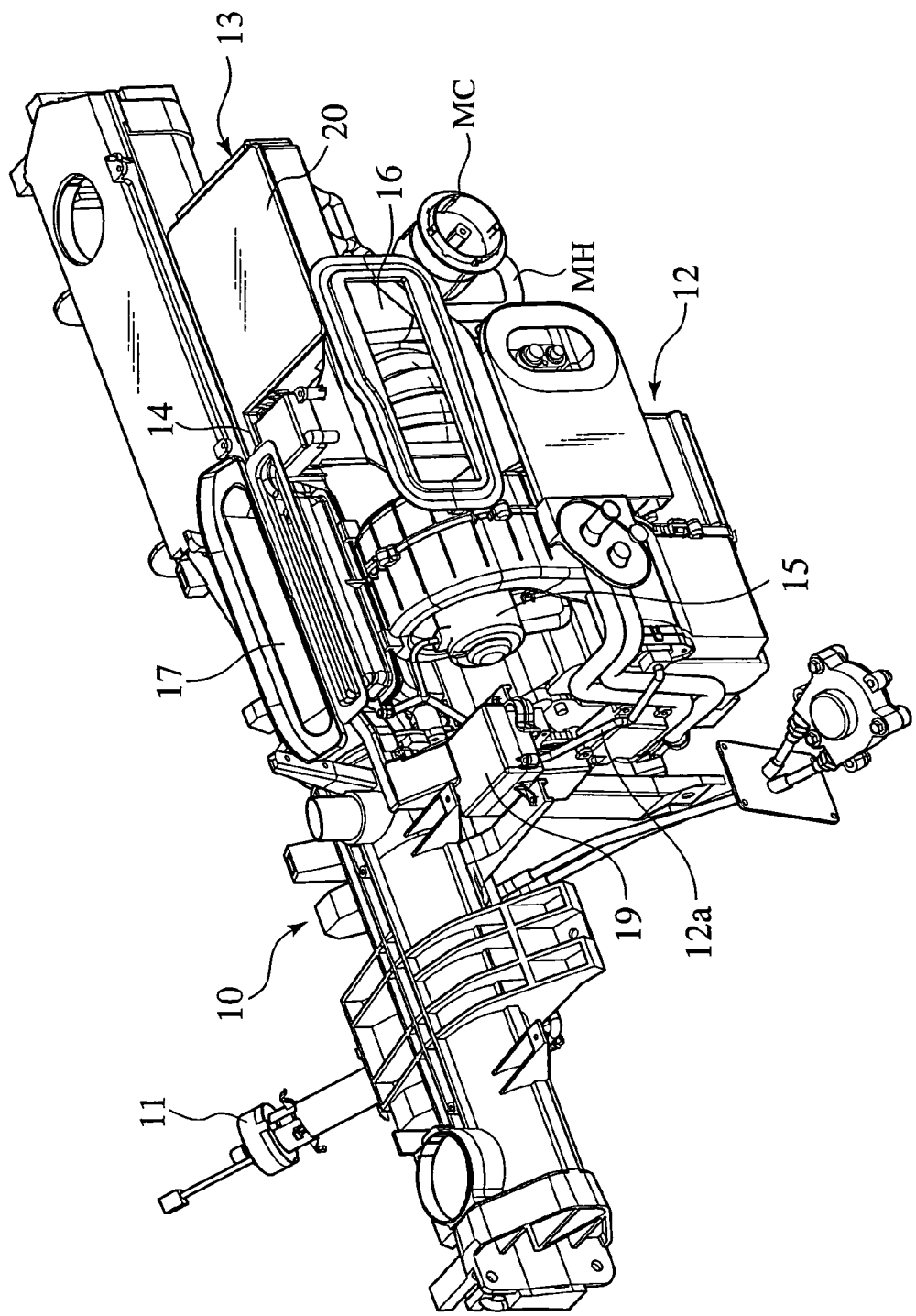
FIG. 1 is a perspective view of a steering member and its vicinity to which a wiring structure according to an embodiment of the present invention is applied.

Referring is now made to FIG. 1. A steering member module 10 is arranged at a hidden side of an instrument panel (not shown in FIG. 1 but schematically shown in FIG. 4) in a manner that the steering member module 10 crosses an inside of an automobile in a width direction thereof. A column shaft module 11 is projected backward and obliquely upward from the steering member module 10 at a driver's side. A steering wheel (not shown) will be attached to a distal end of the column shaft module 11. For controlling a heater, a ventilator and an air-conditioner (HVAC hereinafter), an HVAC control module 12 is arranged at a front side of the steering member module 10 and substantially at a center in a width direction thereof. Narrow space is formed between the steering member module 10 and the HVAC control module 12 and a housing member 13 and a wiring harness housing portion 14 are housed therein as will be described later. The HVAC control module 12 is provided with distribution doors for the heater, a cooler unit and the like.

Figure 2:
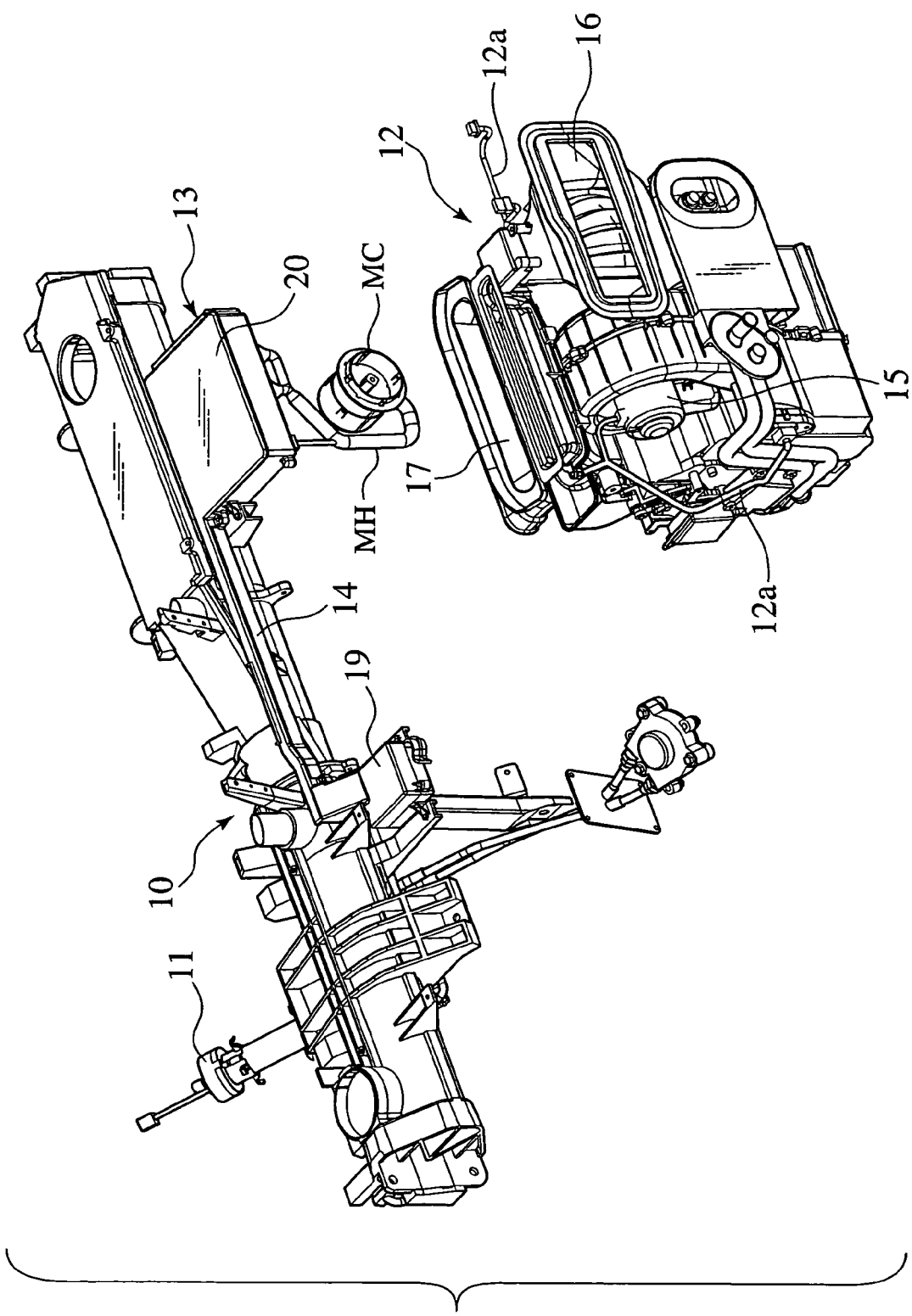
FIG. 2 is an exploded perspective view of the steering member from which an HVAC control module is separated frontward.

Referring is now made to FIG. 2. The HVAC control module 12 is composed of a blower motor 15, an air inlet port 16, a vent outlet port 17 and the like, which are connected to a sub wiring harness 12a. The sub wiring harness 12a is directly connected to an electronic control unit housing portion 20 according to the present embodiment, however, the sub wiring harness 12a may be wired to a connector connection portion 18 (see FIG. 3) alternatively.

Figure 3:
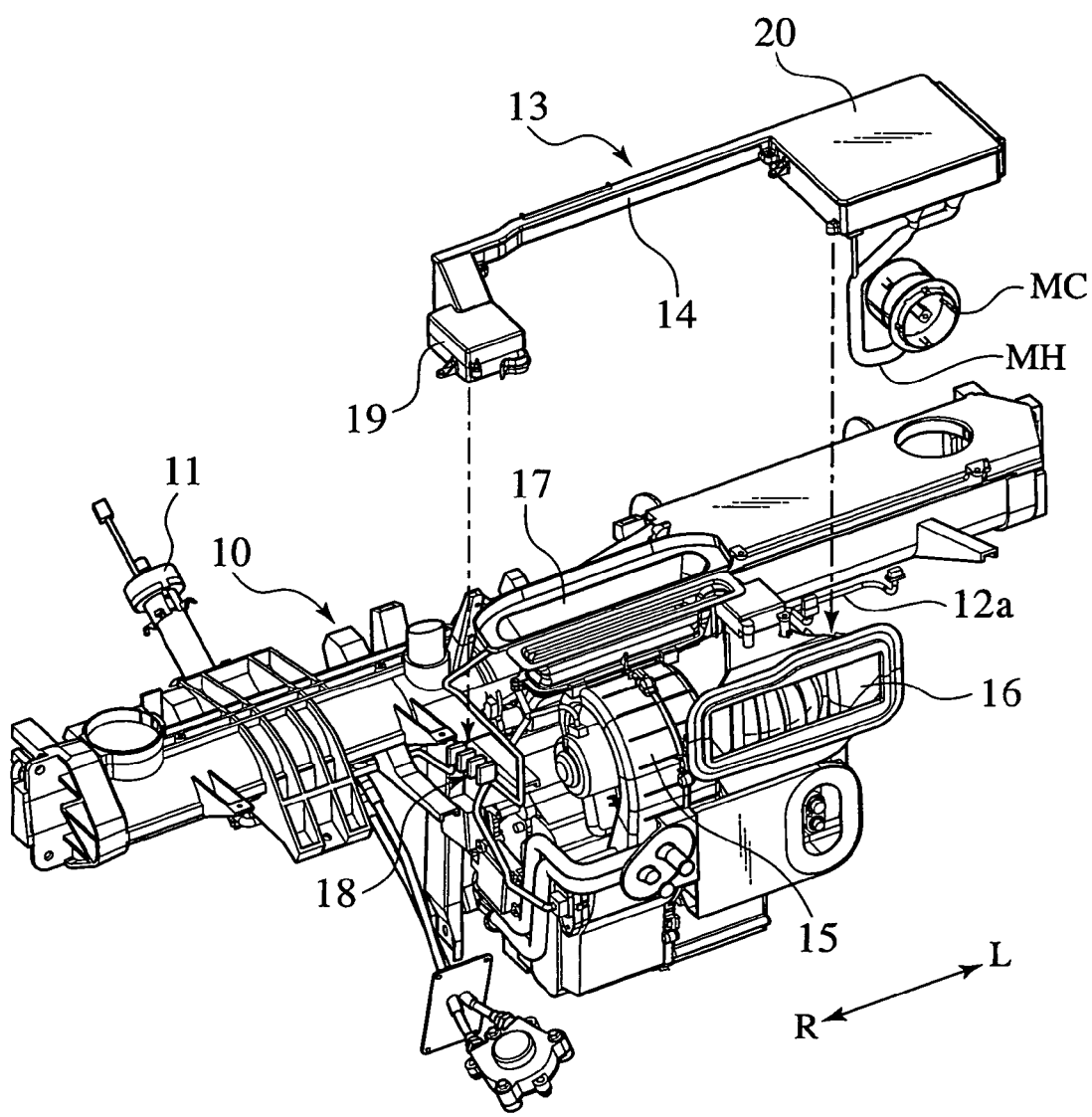
FIG. 3 is an exploded perspective view of the steering member from which a housing member is separated upward.

The housing member 13 for housing wiring harnesses is arranged between the HVAC control module 12 and the steering member module 10 as shown in FIG. 3. The housing member 13 looks like a C-letter shape in a plan view and is integrally composed of a connector housing portion 19 at a driver's seat side, an electronic control unit housing portion 20 at a side of the assistant's seat and the wiring harness housing portion 14 therebetween. A plurality of connectors housed in the connector housing portion 19 are formed in a unified shape having a unified terminal alignment. A power bus circuit, a power of which is supplied from the electronic control units, and a superimposing communication circuit are connected to the connectors housed in the connector housing portion 19.

Both the connector housing portion 19 and an electronic unit housing portion 20 are formed in box shapes, which look rectangular in plan view. The connector housing portion 19 houses a plurality of connectors for connection with the connector connection portion 18. The electronic control unit housing portion 20 houses electronic control units to which the connectors are connected via the wiring harnesses. The HVAC control module 12 is disposed between the connector housing portion 19 and the electronic control unit housing portion 20.

Among portions of the housing member 13, the wiring harness housing portion 14 is formed narrower so as to be insertable in the space formed between the HVAC control module 12 and the steering member module 10.

Figure 4:
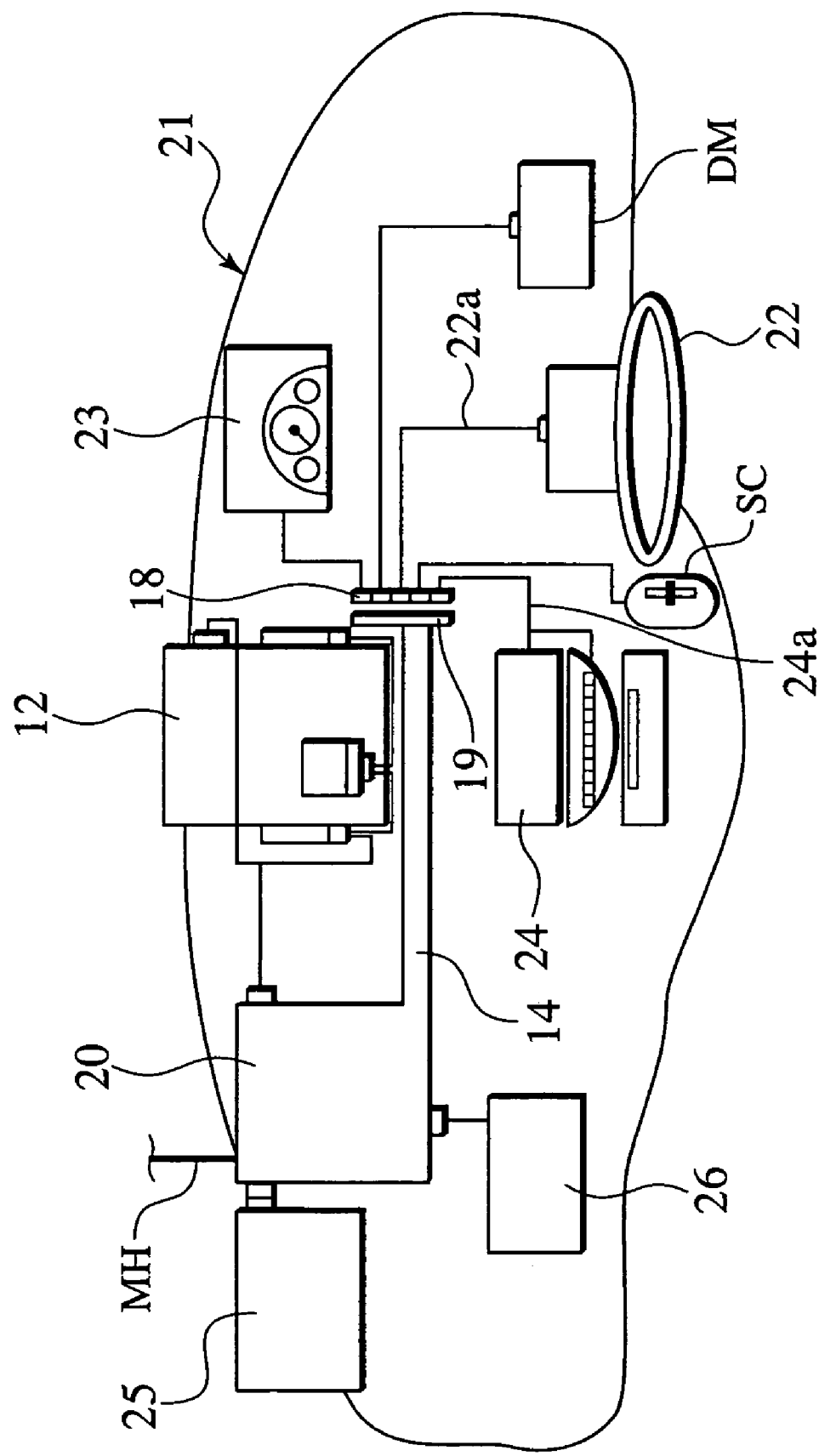
FIG. 4 is a schematic drawing schematically showing the wiring structure in the vicinity of the instrument panel.

Referring is now made to FIG. 4. Cables 22a, 23a, 24a, which are disposed at the hidden side of the instrument panel 21 at the driver's seat side, are respectively wired from the connector connection portion 18 to the steering module 22, various meters 23 and various monitors 24. Regarding a gearshift control unit and a sub module DM for the driver, similar configurations are provided. The electronic control unit housing portion 20 further houses a navigation system 25 arranged at the assistant's seat side, an airbag system 26 and an electronic control unit for the HVAC control module 12 as well as the electronic control units for a plurality of units arranged at the driver's seat side.

The electronic control units are provided with a module side connector MC connected to a connector for the automobile via a main wiring harness MH, which is arranged at the assistant seat side and connected to the outside, and a cockpit control module including a meter amplifier and an amplifier for control of the air conditioner.

The aforementioned embodiment gives the following effects.

Among portions of the housing member 13, the wiring harness housing portion 14 is so dimensioned as to be insertable between the space formed between the HVAC control module 12 and the steering member module 10. Such the wiring harness housing portion 14 is arranged between the HVAC control module 12 and the steering member module 10, thereby small space in the vicinity of the instrument panel can be effectively utilized.

As mentioned above, at the driver's seat side, many units such as the steering module 22, various monitors 24 and various meters 23 are arranged. Therefore it is difficult to arrange the electronic control units at the driver's seat. It is further difficult to arrange them in front of the center of the steering member module 10, where a large unit of the HVAC control module 12 is arranged. On the other hand, enough space to arrange the electronic control units can be made at the assistant's seat side because few units such as the meters are there. According to the embodiment of the present invention, such space is utilized for wiring, thereby the wiring labor can be easily done.

Provided that plural wiring harnesses are wired one by one, the wiring labor becomes very troublesome. However, according to the embodiment of the present invention, the plural wiring harnesses are housed in the housing member 13, which is easy to be handled, thereby wiring can be done at a time and without difficulty.

Furthermore, provided that the HVAC control module 12 occupying large space is arranged at the center of the steering module 10, the wiring harnesses can be easily wired.

Still furthermore, the main wiring harness MH is necessarily formed thick because the main wiring harness MH must serve a lot of connections between the electronic control units and the connectors. According to the embodiment of the present invention, the main wiring harness MH can be formed shorter, thereby the wiring labor is made easy and weight thereof is decreased.

Additionally, the connector connection portion 18 is disposed at a side surface of the HVAC control module 12 and exposed so as to be accessible, thereby electrical connections of the plural units at the driver's seat side can be centralized there and the connection labor becomes easy.

The wiring harnesses led to the units at the driver's seat side can be connected with any positions of the connectors housed in the connector housing member 19, thereby improper connection can be prevented even if the connectors are centralized.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A structure for wiring a wiring harness for an automobile between an electronic control unit and one or more devices, the automobile having a steering member extended from a driver's seat side of the automobile to an assistant's seat side of the automobile, a control module arranged at a center in a width direction of the steering member and an electronic control unit for controlling the devices arranged at the assistant's seat side of the steering member and a plurality of units arranged at the driver's seat side, the structure comprising:
a housing member including;
a first portion having a plurality of first connectors for concentrative connection with the devices;
a second portion housing the electronic control unit; and
a third portion being formed in a slim shape and interconnecting the first portion and the second portion; and
a wiring harness housed in the third portion, the wiring harness interconnecting the first connectors and the electronic control unit,
wherein the housing member is arranged along the steering member in a manner that the third portion is housed between the control module and the steering member, and
wherein the control module is arranged between the first portion and the second portion.

2. The structure of claim 1, wherein the control module controls a heater, a ventilator, an air-conditioner and distribution doors.

3. The structure of claim 1, wherein the electronic control unit comprises a second connector mating with the first connector, an amplifier for a meter and an air-conditioner control amplifier.

4. The structure of claim 1, wherein the first connectors are formed in a unified shape having a unified terminal alignment and connected with a power bus circuit and a superimposing communication circuit of the electronic control unit.

5. The structure of claim 1, wherein the third portion is so dimensioned as to be insertable in space formed between the control module and the steering member.

* * * * *